United States Patent
Alger et al.

(10) Patent No.: US 6,893,487 B2
(45) Date of Patent: May 17, 2005

(54) POWER GENERATION AFTERTREATMENT SYSTEM HAVING A PARTICULATE FILTER DIMENSIONED TO BE INTERCHANGEABLE WITH A MUFFLER

(75) Inventors: Matthew J. Alger, Columbus, OH (US); Cho Y. Liang, West Lafayette, IN (US); Edward J. Woods, Germantown Hills, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/329,313

(22) Filed: Dec. 23, 2002

(65) Prior Publication Data

US 2004/0118282 A1 Jun. 24, 2004

(51) Int. Cl.[7] ............................................... B01D 46/00
(52) U.S. Cl. ..................... 95/273; 55/385.1; 55/490; 55/523; 55/DIG. 30; 96/380; 60/273; 60/311
(58) Field of Search .............................. 55/385.1, 385.3, 55/490, 523, DIG. 30; 95/273; 96/380, 383, 386; 60/273, 311

(56) References Cited

U.S. PATENT DOCUMENTS

| | | | | |
|---|---|---|---|---|
| 3,642,259 A | * | 2/1972 | Bowden | ...................... 60/311 |
| 3,918,945 A | * | 11/1975 | Holloway et al. | ...... 55/DIG. 30 |
| 4,992,669 A | | 2/1991 | Parmley | |
| 5,009,857 A | * | 4/1991 | Haerle | .......................... 60/311 |
| 5,322,537 A | * | 6/1994 | Nakamura et al. | ...... 55/DIG. 30 |
| 6,006,525 A | * | 12/1999 | Tyree, Jr. | ...................... 62/50.6 |
| 6,471,918 B1 | * | 10/2002 | Sherwood | .............. 55/DIG. 30 |
| 6,584,768 B1 | * | 7/2003 | Hecker et al. | ............. 55/385.3 |

* cited by examiner

*Primary Examiner*—Duane Smith
*Assistant Examiner*—Jason M. Greene
(74) *Attorney, Agent, or Firm*—Jason J Stanley

(57) ABSTRACT

A power generation system has a power source and an aftertreatment system connected to the power source. The aftertreatment system is adapted to treat an exhaust of the power source. The aftertreatment system has a particulate filter that is dimensioned to be interchangeable with a muffler.

16 Claims, 6 Drawing Sheets

Fig-3

POWER GENERATION AFTERTREATMENT SYSTEM HAVING A PARTICULATE FILTER DIMENSIONED TO BE INTERCHANGEABLE WITH A MUFFLER

TECHNICAL FIELD

This invention relates generally to power generation systems, and more particularly to a power generation aftertreatment system having a particulate filter dimensioned to be interchangeable with a muffler.

BACKGROUND

In recent years regulatory agencies around the world have instituted changes in the regulations governing the emission levels of power generation systems. The changing of these regulations has resulted in many manufacturers of power generation systems producing aftertreatment systems to be added to their power generation systems. These aftertreatment systems reduce the levels of regulated emissions produced by the power generation systems.

The elements of a power generation aftertreatment system are selected dependent upon (i) the regulations in the region in which the system is to be used and (ii) the type of power source in the power generation system. For example, if the power source uses diesel fuel, some regulations may require that a particulate filter be included in the aftertreatment system to reduce the particulate emissions of the power generation system. In contrast, if the power source uses natural gas as fuel, a particulate filter is typically not needed because the particulates produced by natural gas combustion are typically below emission regulation levels. Regulations in some regions limit the level of noise produced by power generation systems. To comply with these regulations, a noise reduction device, such as a muffler, is often connected to the power generation system.

Another factor in the design of power generation aftertreatment systems is the space in which the aftertreatment system must fit. Many power generation systems are used in areas with tight space constraints, and therefore the aftertreatment system must be as compact as possible. In addition, a smaller aftertreatment system will likely be easier and more economical to transport.

Current power generation aftertreatment systems cannot easily be modified to be used on different types of power generation systems. This limitation of current aftertreatment systems is particularly detrimental to companies that purchase power generation systems and rent them to others. Such companies must purchase several different types of aftertreatment systems to keep in inventory, not knowing which type of power generation system a potential customer may need. This additional inventory increases the capital expenditures of the companies and reduces their profit.

The typical process of attaching aftertreatment systems to power generation systems involves attaching individual elements of the aftertreatment system to the housing of the power generation system. However, a typical aftertreatment system includes several aftertreatment elements that each must be attached to the power generation system. Therefore, several laborers must travel to the site where the power generation system is located, determine the proper location for each aftertreatment element, prepare the power generation system for the attachment of the aftertreatment elements, attach each aftertreatment element to the power generation system, and connect the aftertreatment elements to each other and to the exhaust of the power generation system. This process is both time consuming and expensive.

When an aftertreatment system is to be added to a portable power generation system, other difficulties arise. The top sides of the housings of most portable power generation systems are not strong enough to support the weight of an aftertreatment system. Therefore, a typical procedure for attaching an aftertreatment system to a portable power generation system includes attaching supporting members to a side of the housing of the portable power generation system. These supporting members typically have one end welded to the base of the housing, a body that extends vertically up the side of the housing, and another end that extends above the top side of the housing. The aftertreatment elements are then attached to these members. Adding these supporting members to the housing increases the time and expense required to install the aftertreatment system.

Transportation problems are also inherent in the current method of adding aftertreatment systems to power generation systems. Individual aftertreatment elements are not easily transported via typical shipping methods. In addition, when supporting members are added to the housings of portable power generation systems, the supporting members add width and/or length to the housings. Therefore, these modified housings are often too large to be shipped via conventional means. In fact, special permits are often required to transport such modified housings on highways.

U.S. Pat. No. 4,992,669 issued to Parmley on Feb. 12, 1991 discloses a modular energy system in which a driven unit is connected to a driving unit via a shaft. These modular units are attached to each other via locking assemblies. However, the units that are shown in the '669 patent are each the same size. Stacking such units on top of each other could result in wind loads on the system of sufficient strength to cause damage to the system. In addition, the driven units in the '669 patent do not provide support for internal engine processes but merely use the power created by the driving units.

The power generation aftertreatment system of the present invention solves one or more of the problems set forth above.

SUMMARY OF THE INVENTION

A power generation system has a power source and an aftertreatment system connected to the power source. The aftertreatment system is adapted to treat an exhaust of the power source. The aftertreatment system has a particulate filter that is dimensioned to be interchangeable with a muffler.

An aftertreatment system is adapted for use with a power generation system. The aftertreatment system has a particulate filter that is dimensioned to be interchangeable with a muffler.

A particulate filter is adapted for use in a power generation aftertreatment system. The particulate filter is dimensioned to be interchangeable with a muffler.

A method of converting a natural gas power generation aftertreatment system to a diesel power generation aftertreatment system includes disconnecting a muffler from the natural gas power generation aftertreatment system. A particulate filter is connected to the natural gas power generation aftertreatment system.

BRIEF DESCRIPTION OF THE DRAWINGS

FIG. 2 is a cutaway perspective view of one embodiment of the particulate filter of FIG. 1a;

DETAILED DESCRIPTION

Figure 1A:
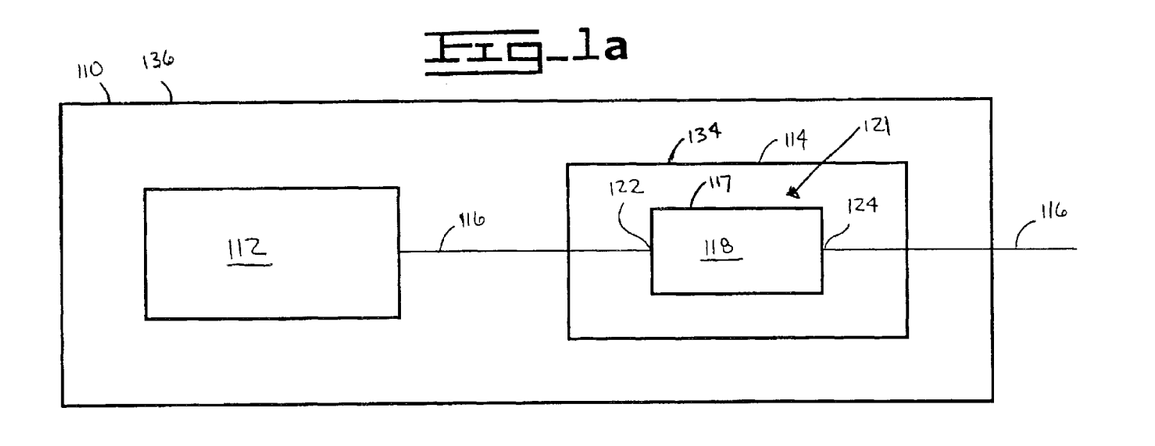
FIG. 1*a* is a diagrammatic illustration of a power generation system having a power source and an aftertreatment system having a particulate filter.
Figure 1B:
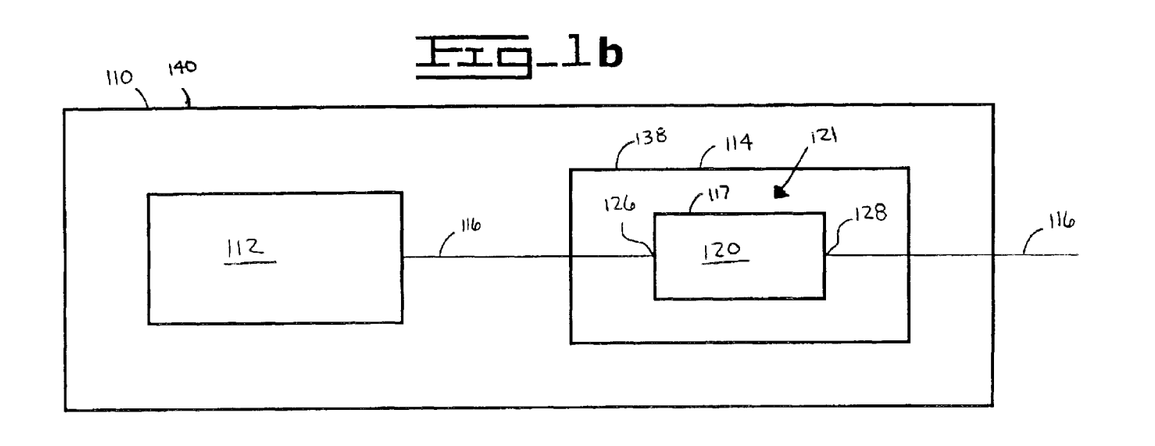
FIG. 1b is a diagrammatic illustration of a power generation system having a power source and an aftertreatment system having a muffler.

Referring to FIGS. 1a and 1b, a power generation system 110 is diagrammatically illustrated. The power generation system has a power source 112 and an aftertreatment system 114 adapted to treat an exhaust 116 of power source 112. Power source 112 is connected to aftertreatment system 114 such that exhaust 116 from power source 112 is in fluid communication with aftertreatment system 114. Aftertreatment system 114 has a noise reduction device 117.

Noise reduction device 117 is in fluid communication with exhaust 116. Noise reduction device 117 may be either a particulate filter 118, as shown in FIG. 1a, or a muffler 120, as shown in FIG. 1b. Particulate filter 118 is adapted for use in aftertreatment system 114 and is dimensioned to be interchangeable with muffler 120. Particulate filter 118 is connected to aftertreatment system 114 at a first location 121, and muffler 120 is connected to aftertreatment system 114 at first location 121.

Particulate filter 118 has an intake portion 122 adapted to accept exhaust 116 of power source 112 into particulate filter 118 and an exhaust portion 124 adapted to expel exhaust 116 from particulate filter 118. Likewise, muffler 120 has an intake portion 126 adapted to accept exhaust 116 of power source 112 into muffler 120 and an exhaust portion 128 adapted to expel exhaust 116 from muffler 120. Intake portion 122 of particulate filter 118 is dimensioned substantially the same as intake portion 126 of muffler 120. Exhaust portion 124 of particulate filter 118 is dimensioned substantially the same as exhaust portion 126 of muffler 120. As used herein, "dimensioned substantially the same as" shall mean that the compared portions, 122/126 and 124/128, are dimensioned such that either particulate filter 118 or muffler 120 may be connected to aftertreatment system 114 without substantial modification to portions, 122, 124, 126, and 128, or aftertreatment system 114.

Figure 2:
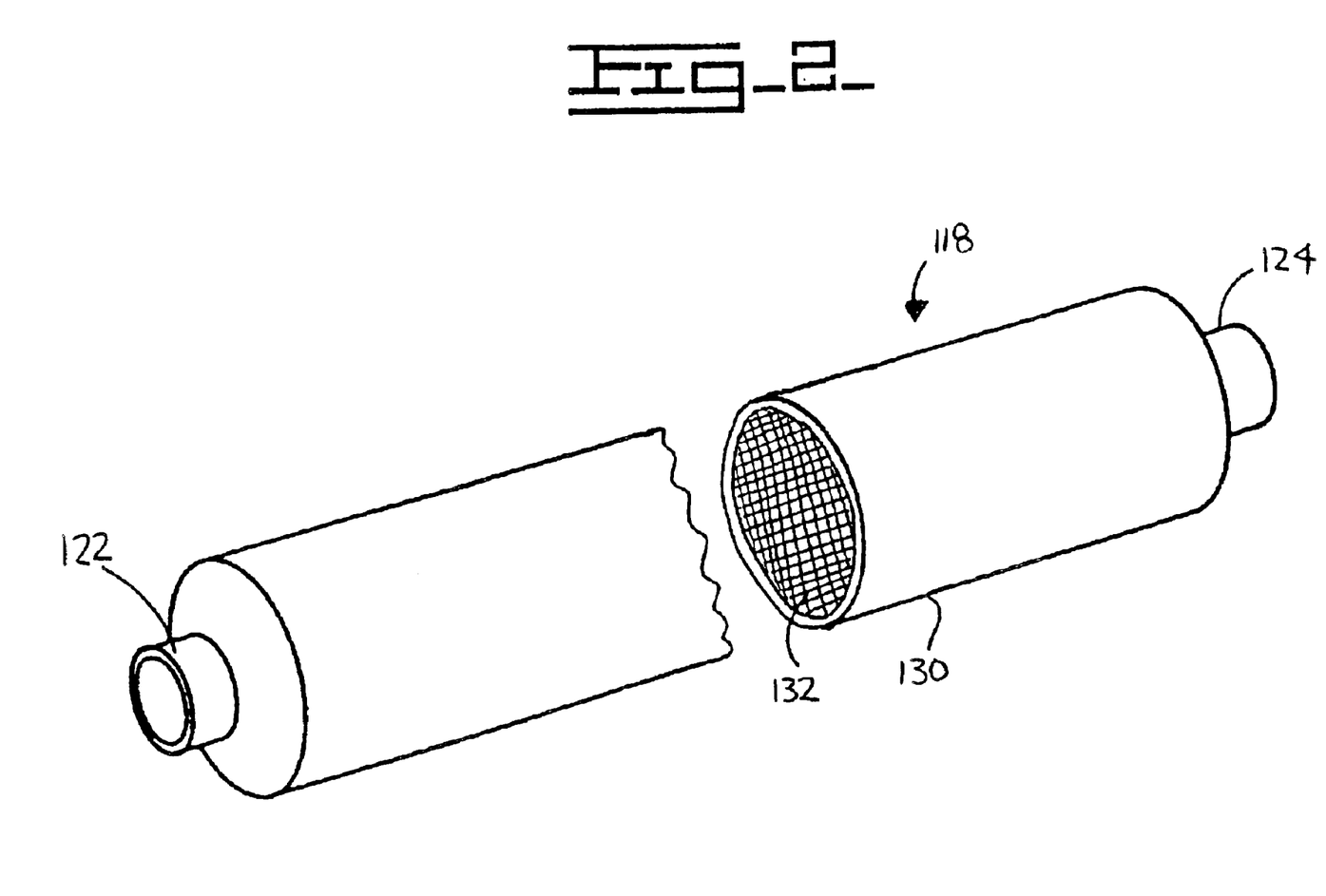

In the embodiment of particulate filter 118 shown in FIG. 2, particulate filter 118 has a housing 130 and a filter element 132 contained within housing 130. In the embodiment of FIG. 2, filter element 132 is a ceramic filter element. However, one skilled in the art will recognize that filter elements 132 of other materials may be used. In FIG. 2, intake portion 122 and exhaust portion 124 of particulate filter 118 are formed as part of housing 130. Intake portion 122 is adapted to accept exhaust 116 of power source 112 into housing 130, and exhaust portion 124 is adapted to expel exhaust 116 from housing 130.

Aftertreatment systems 114 may be connected to power generation systems 110 having power sources 112 that are adapted to use as fuel natural gas, diesel, gasoline, or any other fuel known in the art. Aftertreatment system 114 may be connected to power generation system 110 by connecting individual elements of aftertreatment system 114 to power generation system 110. Another alternative is to connect aftertreatment system 114 to power generation system 110 via an external process module, as described below.

Figure 3:
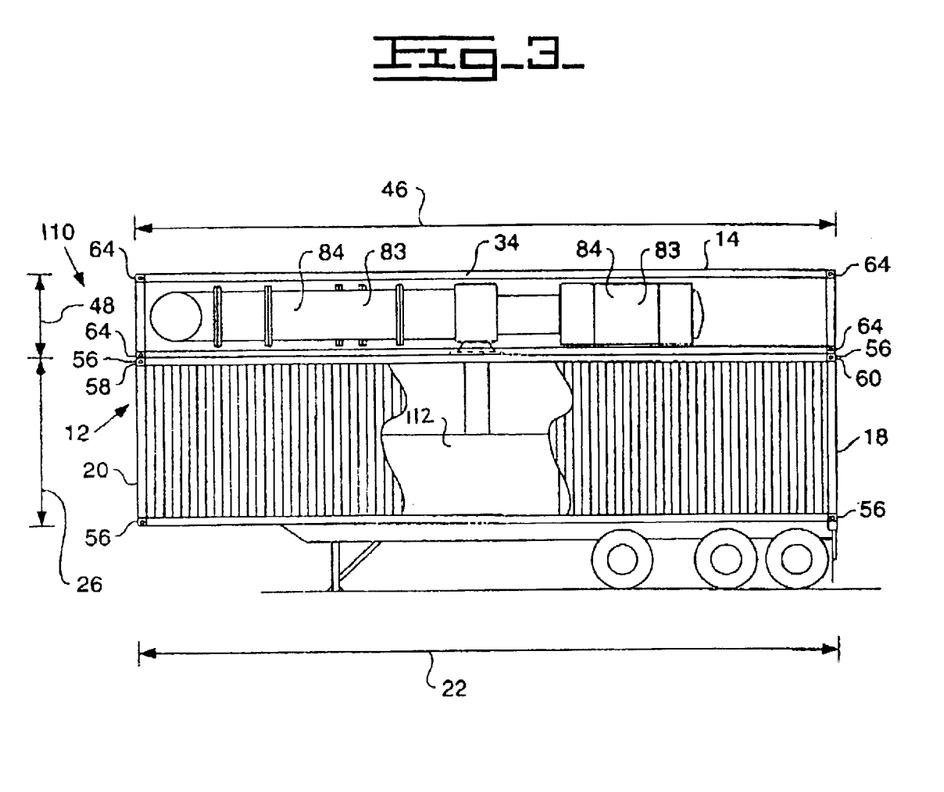
FIG. 3 is a side view of the power generation system of FIG. 1a or FIG. 1b having a power module and an external process module.

Referring to FIG. 3, power generation system 110 includes a power module 12 and an external process module 14 connected to the power module 12. The power module 12 typically includes power source 112. In the embodiment of FIG. 3, power source 112 in contained within power module 12. Power source 112 may be a spark-ignition engine, a compression-ignition engine, a homogenous charge compression ignition engine, a turbine, a fuel cell, or any other power-generating apparatus. As shown in FIG. 3, the power module 12 may be a portable power generation system. However, as used herein "power module" may also include other power generation systems, including custom-built power generation systems, fixed location power generation systems, and portable power generation systems that have been removed from trailers.

The power module 12 in FIG. 3 includes a housing 18 consisting of an ISO container 20. As used herein, "ISO container" shall mean a container meeting the specifications set forth by the International Standardization Organization. The housing 18 of the power module 12 in FIG. 3 consists of a 40-foot ISO container 20, having a length dimension 22 of approximately 40 feet, a width dimension 24, shown in FIG. 7, of approximately 8 feet, and a height dimension 26 of approximately 9.5 feet. However, ISO containers having other length dimensions, width dimensions, and height dimensions may be used as the power module housing 18. Examples of ISO container length dimensions include 20 feet, 30 feet, and 48 feet. Examples of ISO container height dimensions include 8 feet, 8.5 feet, 9 feet, and 9.5 feet. The housing 18 of the power module 12 may alternatively consist of other enclosures or of containers other than ISO containers.

Figure 4:
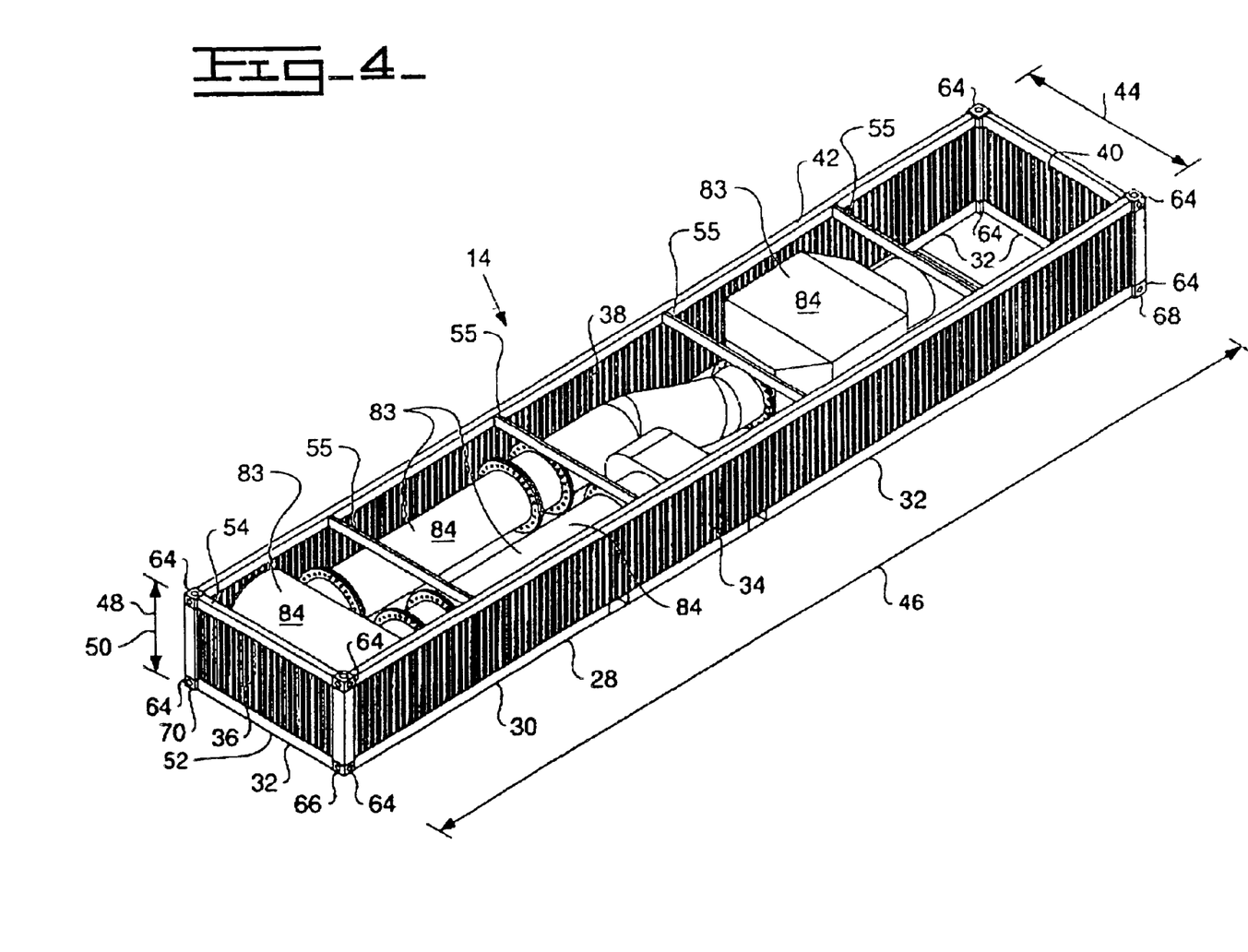
FIG. 4 is a perspective view of the external process module of FIG. 3.

As shown in FIG. 4, the external process module 14 has a frame 28. The frame 28 has a first side 30. In the embodiment in FIG. 4, the first side 30 of the frame 28 is formed by four members 32. However, in alternative embodiments, the first side 30 of the frame 28 could be formed by any other number of members 32 or by a single sheet. In the embodiment of FIG. 4, the frame 28 has a second side 34 connected to the first side 30. The frame 28 has a third side 36 connected to both the first side 30 and the second side 34. The frame 28 has a fourth side 38 connected to the first side 30 and the third side 36. The frame 28 has a fifth side 40 connected to the first side 30, the second side 34 and the fourth side 38. The frame 28 has a sixth side 42 connected to the second side 34, the third side 36, the fourth side 38 and the fifth side 40. In the embodiment of FIG. 4, the frame 28 is a cuboid. As used herein, the term "cuboid" shall mean "a shape having six sides wherein all the sides are squares or rectangles." However, the frame 28 may be of other shapes.

Figure 7:
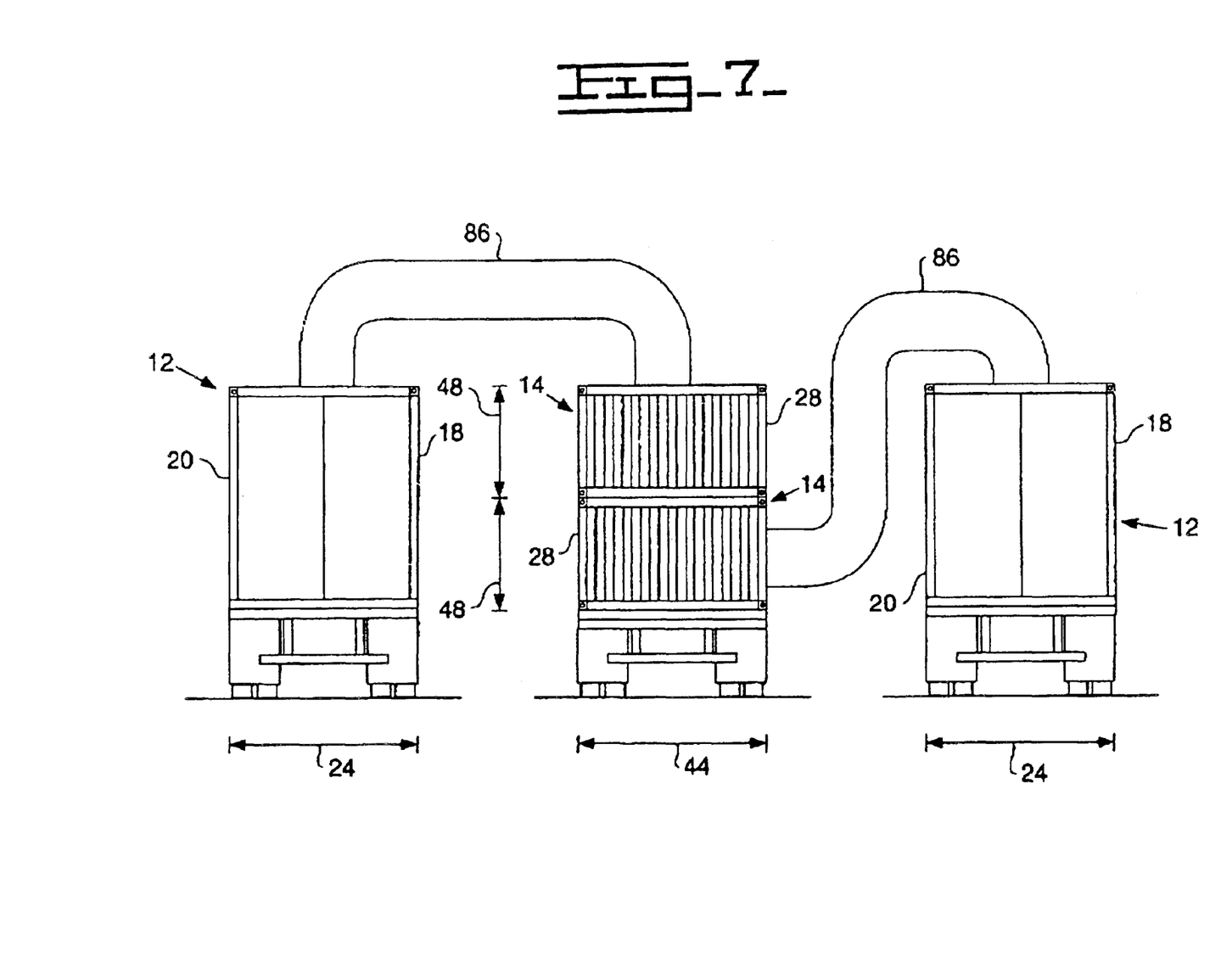
FIG. 7 is a rear view of an alternative embodiment of two power generation systems, each having a power module and an external process module.

In FIG. 4, the frame 28 has a width dimension 44. The width dimension 44 of the frame 28 may be approximately equal to a width dimension of an ISO container. For example, as shown in FIG. 7, the width dimension 44 of the frame 28 of the external process module 14 is approximately equal to the width dimension 24 of the power module housing 18. In the embodiment of FIG. 7, the power module housing 18 is an ISO container 20 having a width dimension 24 of 8 feet. In alternative embodiments, the width dimension 44 of the frame 28 may be approximately equal to the width dimension of ISO containers having width dimensions other than 8 feet or the width dimension of containers that are not ISO containers.

In FIG. 4, the frame 28 has a length dimension 46. The length dimension 46 of the frame 28 may be approximately equal to a length dimension of an ISO container. For example, as shown in FIG. 3, the length dimension 46 of the frame 28 of the external process module 14 is approximately equal to the length dimension 22 of the power module housing 18. In the embodiment of FIG. 3, the power module housing 18 is an ISO container 20 having a length dimension 22 of 40 feet. In other embodiments, the length dimension 46 of the frame 28 may be approximately equal to the length dimension of other ISO containers, including 20 feet, 30 feet and 40 feet. In alternative embodiments, the length dimension 46 of the frame 28 may be approximately equal to the length dimension of containers other than ISO containers.

In FIG. 4, the frame 28 has a height dimension 48. In FIG. 4, the height dimension 48 of the frame 28 is equal to a defined distance 50 between a first surface 52 and a second surface 54. The height dimension 48 of the frame 28 may be approximately equal to the height dimension of an ISO container. Alternatively, the height dimension 48 of the frame 28 may be less than the height dimension of an ISO container. For example, as shown in FIG. 3, the height dimension 48 of the frame 28 of the external process module 14 is approximately half the height dimension 26 of the ISO container 20 making up the power module housing 18. In the embodiment of FIG. 3, the power module housing 18 is an ISO container 20 having a height dimension of 9.5 feet. In other embodiments, the height dimension 48 of the frame 28 may be less than or approximately equal to the height dimension of other ISO containers, including 8 feet, 8.5 feet, and 9 feet. In alternative embodiments, the height dimension 48 of the frame 28 may be less than or approximately equal to the height dimension of containers other than ISO containers.

In alternative embodiments in which the frame 28 of the external process module 14 has only one side, e.g. the frame 28 consists of a sheet or members in a single plane, the second surface 54 is defined as a top surface of the sheet or a top surface of the highest member. Therefore, the height dimension 48 of the frame 28 is equal to the thickness of the sheet or the distance between a bottom surface of the lowest member and the top surface of the highest member.

In the embodiment of FIG. 3, the second side 34 of the external process module frame 28 is open. In other embodiments any number of sides 30, 34, 36, 38, 40, and 42 may be open. In the embodiment of FIG. 4, the second side 34, third side 36, fourth side 38, and fifth side 40 of the external process module frame 28 are covered with corrugated sheeting. In addition, the sixth side 42 includes structural support members 55. Other embodiments of the external process module 14 may have corrugated sheeting and/or structural support members 55 on one or more sides 30, 34, 36, 38, 40 and 42. Alternative embodiments of the external process module 14 may have other materials covering one or more sides, 30, 34, 36, 38, 40, and 42, of the external process module 28, including uncorrugated metal sheeting.

Figure 5:
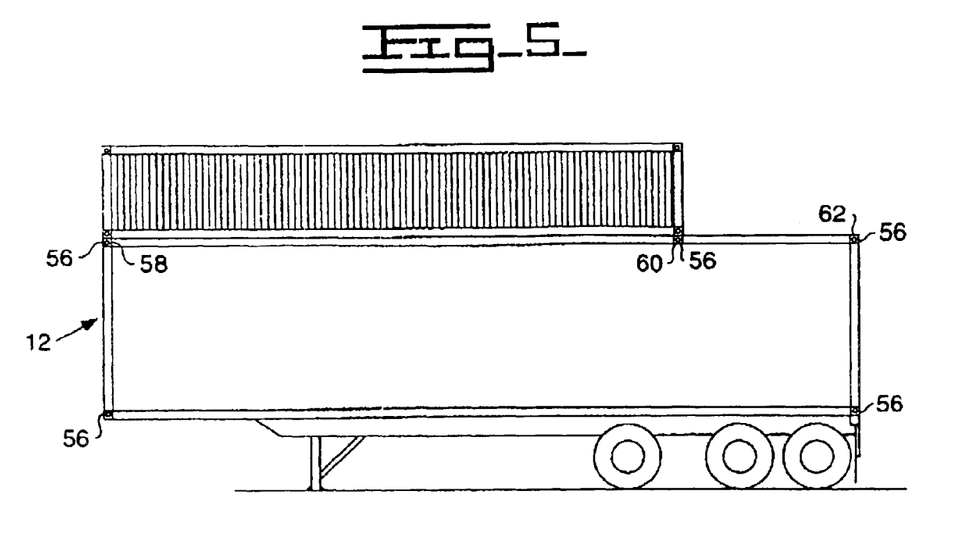
FIG. 5 is a side view of an alternative embodiment of the power generation system of FIG. 1a or FIG. 1b having a power module and an external process module.

As shown in FIG. 3, the power module 12 has at least one connection zone 56. Although only four connection zones 56 are visible in FIG. 3, the embodiment of the power module 12 in FIG. 3 has eight connection zones 56, each located on a corner of the power module housing 18. A first connection zone 58 is spaced from a second connection zone 60 by approximately 20 feet. In alternative embodiments, the first connection zone 58 may be spaced from the second connection zone 60 by approximately 30 feet, approximately 40 feet, or approximately 48 feet. Alternative embodiments of power modules 12 may have different numbers or placements of connection zones 56. For example, in the embodiment of FIG. 5, the power module 12 has ten connection zones 56. In FIG. 5, the second connection zone 60 is spaced 40 feet from the first connection zone 58, and a third connection zone 62 is spaced 48 feet from the first connection zone 58.

As shown in FIG. 3, the external process module 14 has at least one connection zone 64 configured to align with the at least one connection zone 56 of the power module 12. In the embodiment in FIG. 4, the external process module 14 has 8 connection zones 64, each located on a corner of the frame 28. A first connection zone 66 is spaced from a second connection zone 68 by approximately 20 feet. In alternative embodiments, the first connection zone 66 may be spaced from the second connection zone 68 by approximately 30 feet, approximately 40 feet, or approximately 48 feet. In the embodiment of FIG. 4, the first connection zone 66 is spaced from a third connection zone 70 by approximately 8 feet. Alternative embodiments of external process modules 14 may have different numbers or placements of connection zones 64.

Figure 6:
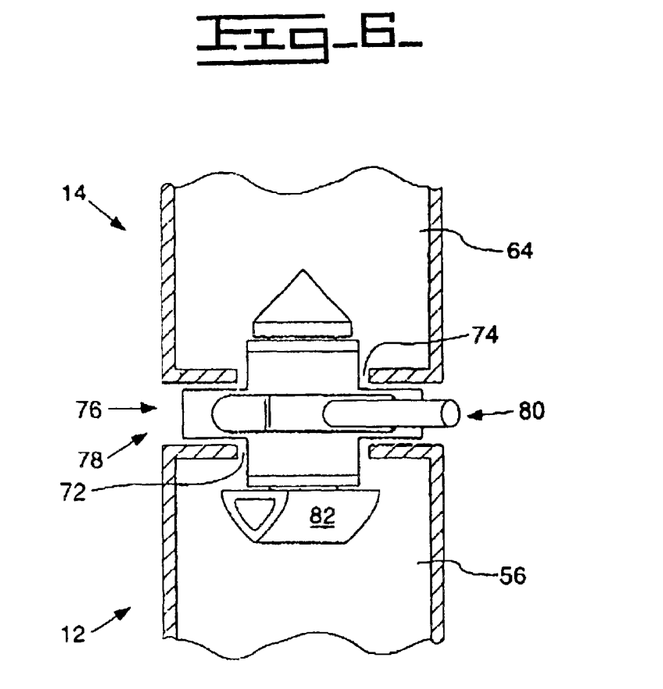
FIG. 6 is an enlarged sectional view of a connection zone of the power module of any of FIGS. 3–5 and a connection zone of the external process module of any of FIGS. 3–5.

FIG. 6 shows one embodiment of a power module connection zone 56 and an external process module connection zone 64. In the embodiment of FIG. 6, the power module connection zone 56 has at least one orifice 72, and the external process module connection zone 64 has at least one orifice 74. A means 76 for removably connecting the external process module 14 to the power module 12 is configured to engage the power module connection zone 56 and the external process module connection zone 64. In the embodiment of FIG. 5, the means 76 is a fastener 78, and the fastener 78 is a locking assembly 80. The locking assembly 80 has at least one rotatable member 82. The at least one rotatable member has a first position that enables the rotatable member to fit within either the at least one orifice 74 of the external process module connection zone 64 or the at least one orifice 72 of the power module connection zone 56. The at least one rotatable member has a second position that prevents the rotatable member from being inserted or removed from either the at least one orifice 74 of the external process module connection zone 64 or the at least one orifice 72 of the power module connection zone 56.

Power module connection zones 56 and external process module connection zones 64 may be of alternative configurations. For example, such connection zones, 56 and 64, may be reinforced areas of the power module housing 18 or external process module frame 28, respectively. Additionally, the connection zones, 56 and 64, may be connected by one or more of several types of fasteners 78, including bolts, screws, pins, rivets, dowels, latches and studs. If quick removal of the external process module 14 from the power module 12 is not required, the external process module 14 may be more permanently attached to the power module 12, such as by welding.

In the embodiments of FIG. 3 and FIG. 4, the external process module 14 has at least one engine support element 83 connected to the frame 28. As used herein, the term "engine support element" shall mean a device or apparatus useful in supporting an internal process of the power source 112 or useful in treating an emission from the power source 112. Examples of engine support elements include heat recovery elements, cooling elements, turbocharger elements, air intake elements, exhaust system elements, fuel storage elements, and aftertreatment elements. In the embodiments of FIG. 3 and FIG. 4, the at least one engine support element is an aftertreatment element. The aftertreatment element 84 may be any of a selective catalytic reduction device, muffler 120, a urea injection module, an emissions monitoring device, a urea tank, an air compressor, an oxidation catalyst, particulate filter 118, ductwork, or any other device or apparatus useful in the process of reduction of an emission from the power source 112 or the process of removal of a certain substance from the exhaust of the power source 112. Therefore, aftertreatment system 114 may be adapted 116 to be attached to external process module 14. In one embodiment, aftertreatment system 114 is connected to frame 28 of external process module 14.

INDUSTRIAL APPLICABILITY

Referring to FIG. 1a, power source 112 uses fuel to create energy and produces exhaust 116. Exhaust 116 enters aftertreatment system 114. Exhaust 116 passes through inlet portion 122 of particulate filter 118 and into contact with filter element 132, as shown in FIG. 2. Particulate filter 118 removes particulate matter from exhaust 116. In addition, particulate filter 118 reduces the level of noise produced by power source 112. Due to this sound-deadening characteristic of particulate filter 118, aftertreatment system 114 may not need to have any other noise reduction device to obtain noise emissions in compliance with applicable regulations. Exhaust 116 is expelled from particulate filter 118 via exhaust portion 124, and exhaust 116 subsequently exits aftertreatment system 114. Exhaust 116 may be treated by one or more other aftertreatment elements either before or after entering particulate filter 118.

Referring to FIG. 1b, power source 112 uses fuel to create energy and produces exhaust 116. Exhaust 116 enters aftertreatment system 114. Exhaust 116 passes through inlet portion 126 of muffler 120. Muffler 120 reduces the level of noise produced by power source 112. Exhaust 116 is expelled from muffler 120 via exhaust portion 128, and exhaust 116 subsequently exits aftertreatment system 114. Exhaust 116 may be treated by one or more other aftertreatment elements either before or after entering muffler 120.

Power generation systems 110 using natural gas as fuel typically do not produced exhaust 116 having particulate matter levels in excess of regulations. Therefore, particulate filters 118 are not typically needed in aftertreatment systems 114 for such power systems 110. In contrast, exhaust 116 produced by power generation systems 110 using diesel fuel typically needs to be treated by a particulate filter 118 to keep emissions below the levels set by regulations. Both natural gas and diesel power generation systems may need noise reduction devices to maintain compliant noise levels.

Therefore, a diesel power generation aftertreatment system 134, shown in FIG. 1a., (i.e., a power generation aftertreatment system 114 having particulate filter 118) may be used on a diesel power generation system 136. Likewise, a natural gas power generation aftertreatment system 138, shown in FIG. 1b., (i.e., a power generation aftertreatment system 114 having muffler 120) may be used on a natural gas power generation system 140. Such use of aftertreatment systems 114 will aid both diesel and natural gas power generation systems, 136 and 140, in obtaining required particulate matter and noise emissions. In addition, by using particulate filter 118 on a diesel power generation system 136 instead of a combination of both a particulate filter and a muffler, the aftertreatment system 134 is more compact and less expensive.

Aftertreatment systems 134 and 138 may be more economical for aftertreatment rental companies than current systems. A natural gas power generation aftertreatment system 138, shown in FIG. 1b., may be easily converted into a diesel power generation aftertreatment system 134, shown in FIG. 1a. Muffler 120 is disconnected from natural gas power generation aftertreatment system 138. Then, particulate filter 118 is connected to natural gas power generation aftertreatment system 138 at first location 121, thereby producing diesel power generation aftertreatment system 134.

Similarly, a diesel power generation aftertreatment system 134, shown in FIG. 1a., may be easily converted into a natural gas power generation aftertreatment system 138, shown in FIG. 1b. Particulate filter 118 is disconnected from diesel power generation aftertreatment system 134. Then, muffler 120 is connected to diesel power generation aftertreatment system 134 at first location 121, thereby producing natural gas power generation aftertreatment system 138. Thus, instead of purchasing and storing two separate aftertreatment systems, an aftertreatment system rental company may purchase one aftertreatment system 114 with interchangeable particulate filter 118 and muffler 120. The aftertreatment rental company may then easily configure the aftertreatment system 114 for use on any type of power generation system 110.

Aftertreatment system 110 may be connected to power source 112 in any conventional manner. Alternatively, aftertreatment system 110 may be connected to an external process module 14, and the external process module 114 may be connected to a power module 12 containing power source 112.

The embodiment of the power system 110 of FIG. 3 is assembled by lifting the external process module 14 onto the power module 12. The external process module 14 is then connected to the power module 12. One method of connecting the external process module 14 to the power module 12 includes connecting the frame 28 to the power module 12. This may be accomplished by aligning at least one connection zone 64 of the external process module 14 with at least one connection zone 56 of the power module 12. Then at least one connection zone 64 of the external process module 14 is connected with at least one connection zone 56 of the power module 12 by at least one fastener 78, such as the locking assembly 80 of FIG. 6. Other fasteners 78 may be used to connect the external process module 14 to the power module 12, or the external process module 14 may be more permanently attached to the power module 12, such as by welding.

In the embodiment of FIG. 6, the at least one rotatable member 82 of the locking assembly 80 is placed in the first position. The at least one rotatable member 82 is then inserted into either the at least one orifice 72 of the power module 12 or the at least one orifice 74 of the external process module 14. The at least one rotatable member 82 is then placed into the second position, thereby preventing the at least one rotatable member from being removed from either the at least one orifice 72 of the power module 12 or the at least one orifice 74 of the external process module 14. The power module 12 is thus connected to the external process module 14.

The external process module 14 may be connected to areas of the power module 12 other than that shown in FIG. 3. For example, the external process module 14 may be attached to a different side of the power module 12. In another embodiment of the power system 110, shown in FIG. 7, the frame 28 of the external process module 14 is not directly attached to the power module 12. As shown in FIG. 7, the external process module 14 is connected to the power module 12 via the aftertreatment ductwork 86.

The at least one aftertreatment element 84 of the external process module 14 of FIG. 3 is connected to the power module 12 such that exhaust 116 from the power source 112 is directed into the at least one aftertreatment element 84. In one alternative embodiment, the at least one fuel storage element of the external process module 14 is connected to the power module 12 such that the fuel stored in the fuel storage element is supplied to the power source 112. In another alternative embodiment, the at least one heat recovery element of the external process module 14 is positioned such that the at least one heat recovery element can recover heat produced by the power source 112. In another alternative embodiment, the at least one cooling element is positioned such that a fluid heated by the power module 12 is cooled by the at least one cooling element.

The embodiments of external process modules 14 that have length dimensions 46, width dimensions 44 and height dimensions 48 approximately equal to those of ISO containers may be transported in the same ways as ISO containers, including cargo ships, trains, or trailers pulled by on-highway trucks. Those embodiments of external process modules 14 with height dimensions 48 that are approximately half the height dimensions of ISO containers may offer an additional benefit, as shown in FIG. 7. Two or more external process modules 14 may be connected together and transported in the same space as one ISO container 20. Therefore, two such external process modules 14 may be transported on one trailer, reducing transportation expenses.

Those external process modules 14 that have height dimensions 48 less than the height dimensions 26 of the power modules 12 to which they are attached may provide an additional benefit. When attached to power modules 12, the smaller surface area of such external process modules 14 results in wind forces on the power system 110 that are less than the wind forces on power systems 110 having external process modules 14 with larger height dimensions 26. Therefore, the risk that the power system 110 will suffer wind damage is reduced by utilizing external process modules 14 with lesser height dimensions 26.

A power system 110 having an external process module 14 may have other benefits over power systems 110 having aftertreatment elements 84 individually attached to the power module 12. The external process module 14 can typically be attached to the power module 12 without making modifications to the power module 12, such as welding supporting members to the side of the power module 12. Therefore, if the power system 110 needs to be moved, the external process module 14 may be easily removed from the power module 12 and the power module 12 may be transported via standard shipping methods. The time and expense of obtaining special permits to transport modified power modules 12 can be avoided. Also, external process modules 14 that are attached to power modules 12 via locking assemblies 80, such as those in FIG. 5, are quicker and cheaper to install upon and remove from power modules 12 than individual aftertreatment elements 84. In addition, external process modules 14 may be easily transferred from one power module 12 to another. For example, if a power module 12 needs to be repaired or replaced, the external process module 14 from the defective power module 12 may likely be removed and attached to the replacement power module 12.

Other aspects, objects, and advantages of this invention can be obtained from a study of the drawings, the disclosure, and the appended claims.

What is claimed is:

1. A portable power generation system comprising:
   a power source;
   an aftertreatment system having a preestablished configuration and being connected to said power source, said aftertreatment system adapted to treat an exhaust of said power source, said aftertreatment system having a particular filter dimensioned to be interchangeable with a muffler;
   a housing having said power source therein;
   said housing being a stationary unit adapted to a preestablished site; and
   said preestablished site defining said preestablished configuration of said aftertreatment system.

2. The power generation system of claim 1 wherein said particulate filter has a housing and a filter element contained within said housing, said housing having an intake portion adapted to accept said exhaust into said housing and an exhaust portion adapted to expel said exhaust from said housing, said intake portion dimensioned substantially the same as an intake portion of said muffler, said exhaust portion dimensioned substantially the same as an exhaust portion of said muffler.

3. The power generation system of claim 2 wherein said filter element is a ceramic filter element.

4. The power generation system of claim 1 wherein said power source is adapted to use diesel fuel.

5. The power generation system of claim 1 further including
   an external process module having a frame, said external process module connected to said housing of said power generation system, said aftertreatment system connected to said frame.

6. An aftertreatment system adapted for use with a power generation system comprising a particulate filter dimensioned to be interchangeable with a muffler.

7. The aftertreatment system claim 6 wherein said particulate filter has a housing and a filter element contained within said housing, said housing having an intake portion adapted to accept an exhaust of a power source into said housing and an exhaust portion adapted to expel said exhaust from said housing, said intake portion dimensioned substantially the same as an intake portion of said muffler, said exhaust portion dimensioned substantially the same as an exhaust portion of said muffler.

8. The aftertreatment system of claim 7 wherein said filter element is a ceramic filter element.

9. The aftertreatment system of claim 6 wherein said aftertreatment system is adapted to be connected to an external process module.

10. A particulate filter adapted for use in a power generation aftertreatment system, said particulate filter dimensioned to be interchangeable with a muffler.

11. The particulate filter of claim 10 wherein said particulate filter has a housing and a filter element contained within said housing, said housing having an intake portion adapted to accept an exhaust of a power source into said housing and an exhaust portion adapted to expel said exhaust from said housing, said intake portion dimensioned substantially the same as an intake portion of said muffler, said exhaust portion dimensioned substantially the same as an exhaust portion of said muffler.

12. The particulate filter of claim 10 wherein said filter element is a ceramic filter element.

13. A method of converting a portable natural gas power generation aftertreatment system having a first preestablished aftertreatment configuration to a portable diesel power generation aftertreatment system having a second preestablished aftertreatment configuration for use at a preestablished site location, said preestablished site location determining said second preestablished aftertreatment configuration, said first preestablished aftertreatment system configuration having a muffler connected at a first location, comprising:

disconnecting said muffler from said natural gas power generation aftertreatment system; and connecting a particulate filter to said natural gas power generation aftertreatment system at said first location.

14. The method of claim 13 wherein said particulate filter has a housing and a filter element contained within said housing, said housing having an intake portion adapted to accept an exhaust of a power source into said housing and an exhaust portion adapted to expel said exhaust from said housing, said intake portion dimensioned substantially the same as an intake portion of said muffler, said exhaust portion dimensioned substantially the same as an exhaust portion of said muffler.

15. The method of claim 14 wherein said filter element is a ceramic filter element.

16. The method of claim 14 wherein said natural gas power generation aftertreatment system is adapted to be connected to an external process module.

* * * * *